United States Patent
Oh

(10) Patent No.: US 8,593,588 B2
(45) Date of Patent: Nov. 26, 2013

(54) LIQUID CRYSTAL DISPLAY DEVICE WITH UNIFORM LUMINANCE

(75) Inventor: Guen-Taek Oh, Busan (KR)

(73) Assignee: LG Display Co., Ltd., Seoul (KR)

( * ) Notice: Subject to any disclaimer, the term of this patent is extended or adjusted under 35 U.S.C. 154(b) by 728 days.

(21) Appl. No.: 12/003,761

(22) Filed: Dec. 31, 2007

(65) Prior Publication Data

US 2008/0180600 A1      Jul. 31, 2008

(30) Foreign Application Priority Data

Jan. 31, 2007   (KR) .................. 10-2007-0010255

(51) Int. Cl.
*G02F 1/1335*   (2006.01)
*A47F 3/00*     (2006.01)
*F21V 7/04*     (2006.01)

(52) U.S. Cl.
USPC ............... 349/65; 349/61; 349/62; 349/64; 362/561; 362/610; 362/615; 362/609; 362/624

(58) Field of Classification Search
USPC ........ 349/65, 61–62; 362/609–610, 615, 624, 362/561
See application file for complete search history.

(56) References Cited

U.S. PATENT DOCUMENTS 6,147,724 A * 11/2000 Yoshii et al. ................... 349/62
6,313,891 B1 * 11/2001 Nagakubo et al. ............. 349/65
2003/0179580 A1 * 9/2003 Ito et al. ....................... 362/306
2006/0092670 A1 5/2006 Shiau et al.
2007/0230217 A1 * 10/2007 Sakaki ........................ 362/624

FOREIGN PATENT DOCUMENTS

| JP | 06174934 | * | 6/1994 |
| JP | 2006-128102 A | | 5/2006 |
| KR | 10-2001-0011935 A | | 2/2001 |
| KR | 10-2007-0009185 A | | 1/2007 |

OTHER PUBLICATIONS

KIPO—Office Action for Korean Patent Application No. 10-2007-0010255—Issued on Apr. 24, 2013.

* cited by examiner

*Primary Examiner* — Lauren Nguyen

(74) *Attorney, Agent, or Firm* — Morgan, Lewis & Bockius LLP

(57) ABSTRACT

Disclosed is a liquid crystal display device, including: a liquid crystal panel, a light guide plate disposed in a rear direction of the liquid crystal panel, a lamp disposed along at least one side edge of the light guide plate, a lamp housing covering a portion of a circumference of the lamp, and a reflecting plate disposed at a rear surface of the light guide plate, wherein a protrusion portion is disposed at an inner surface of the lamp housing adjacent to the reflecting plate, and an end portion of the reflecting plate is curved to extend toward the protrusion portion, thus to provide a liquid crystal display panel which can obtain uniform luminance and minimized light leakage.

10 Claims, 5 Drawing Sheets

LIQUID CRYSTAL DISPLAY DEVICE WITH UNIFORM LUMINANCE

BACKGROUND OF THE INVENTION

1. Field of the Invention

The present invention relates to a liquid crystal display device, and more particularly, to a liquid crystal display device which can obtain uniform luminance and minimized light leakage.

2. Description of the Related Art

In general, a liquid crystal display (LCD) device is a device that displays a desired image by adjusting optical transmittance of liquid crystal cells arranged in a matrix shape according to picture signal information. The liquid crystal display device uses light irradiated from a backlight unit to implement an image on a liquid crystal panel.

As shown in FIG. 1, such liquid crystal display device 1 includes a liquid crystal panel 2 on which liquid crystal cells of a pixel unit are arranged in a matrix shape, a backlight unit 3 uniformly supplying light to the liquid crystal panel 2, a bottom cover 4 for receiving the backlight unit 3, and a top cover 5 coupled to the bottom cover 4 for receiving the liquid crystal panel 2 and the backlight unit 3 therein. And, the backlight unit 3 includes a light guide plate 3a disposed at a rear surface of the liquid crystal panel 2, a lamp 3b disposed along one side surface (incident plane, entrance surface) of the light guide plate 3a, a lamp housing 3c covering the lamp 3b, optical sheets 3d disposed between the light guide plate 3a and the liquid crystal panel 2, and a reflecting plate 3e disposed between the bottom cover 4 and the light guide plate 3a. Here, the reflecting plate 3e is mounted at a lower surface portion of the bottom cover 4, and is spaced from a rear surface of the light guide plate 3a with a certain distance therebetween.

Light from the lamp 3d is incident onto the one side surface (incident plane, entrance surface) of the light guide plate 3a, and the incident light is reflected to the rear surface of the light guide plate 3a, thereby being irradiated onto the liquid crystal panel 2.

However, some of light emitted from the lamp 3d may not be incident onto the incident plane (entrance surface) of the light guide plate 3a, but be incident onto the spaced area between the light guide plate 3a and the reflecting plate 3e. Such undesirable light is reflected to the reflecting plate 3e again, and then is irradiated onto the liquid crystal panel 2, thereby not being considered as light that is uniformly induced by the light guide plate 3a. Such uncontrolled light causes non-uniform luminance of the liquid crystal panel 2 and light leakage.

SUMMARY OF THE INVENTION

Therefore, the present invention is to provide a liquid crystal display device which can obtain uniform luminance and minimized light leakage.

To achieve these and other advantages and in accordance with the purpose of the present invention, as embodied and broadly described herein, there is provided a liquid crystal display device, including: a liquid crystal panel, a light guide plate disposed in a rear direction of the liquid crystal panel, a lamp disposed along at least one side edge of the light guide plate, a lamp housing covering a portion of a circumference of the lamp, and a reflecting plate disposed at a rear surface of the light guide plate, wherein a protrusion portion is disposed at an inner surface of the lamp housing adjacent to the reflecting plate, and an end portion of the reflecting plate is curved to extend toward the protrusion portion.

Here, the lamp housing may include first and second surfaces disposed parallel to each other having the lamp therebetween, and a third surface for connecting the first and second surfaces. The protrusion portion may protrude toward the second surface from the first surface adjacent to the reflecting plate.

And, the light guide plate may have an incident plane (entrance surface) onto which light from the lamp is incident, and the protrusion portion may be disposed adjacent to the incident plane (entrance surface).

Also, the protrusion portion may not be overlapped with the light guide plate.

Here, the first surface may extend to be partially overlapped with the light guide plate.

And, the first surface may not be overlapped with the light guide plate.

Also, the reflecting plate may include a main body portion and a curved portion being curved from the main body portion, and the curved portion may extend toward the protrusion portion so as to be supported thereat.

Here, the curved portion serves to prevent light emitted from the lamp from being incident onto an area between the light guiding plate and the reflecting plate.

Further, a portion of the curved portion may contact a corner of the light guiding plate.

To achieve these and other advantages and in accordance with the purpose of the present invention, there is provided a liquid crystal display device, including: a liquid crystal panel, a light guide plate disposed in a rear direction of the liquid crystal panel, a lamp disposed along at least one side edge of the light guide plate, a lamp housing covering a portion of a circumference of the lamp, a reflecting plate disposed at a rear surface of the light guide plate, and a bottom cover having a lower surface portion for mounting the reflecting plate thereon and a side surface portion upwardly extending from the lower surface portion, wherein a protrusion portion protruding toward the liquid crystal panel is disposed at the lower surface portion of the bottom cover, an opening for inserting the protrusion portion therein is positioned at an inner surface of the lamp housing adjacent to the reflecting plate, and an end portion of the reflecting plate is curved to extend toward the protrusion portion.

Here, the light guide plate may have an entrance surface (incident plane) onto which light from the lamp is incident, and the protrusion portion may be disposed adjacent to the entrance surface (incident plane).

Also, the protrusion portion may not be overlapped with the light guide plate.

Further, the end portion of the reflecting plate supported by the protrusion portion serves to prevent light emitted from the lamp from being incident onto an area between the light guiding plate and the reflecting plate.

And, the end portion of the reflecting plate curved may partially contact a corner of the light guiding plate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, in which.

DETAILED DESCRIPTION OF THE INVENTION

Description will now be given in detail of the liquid crystal display device according to the present invention, examples of which are illustrated in the accompanying drawings.

Figure 1:
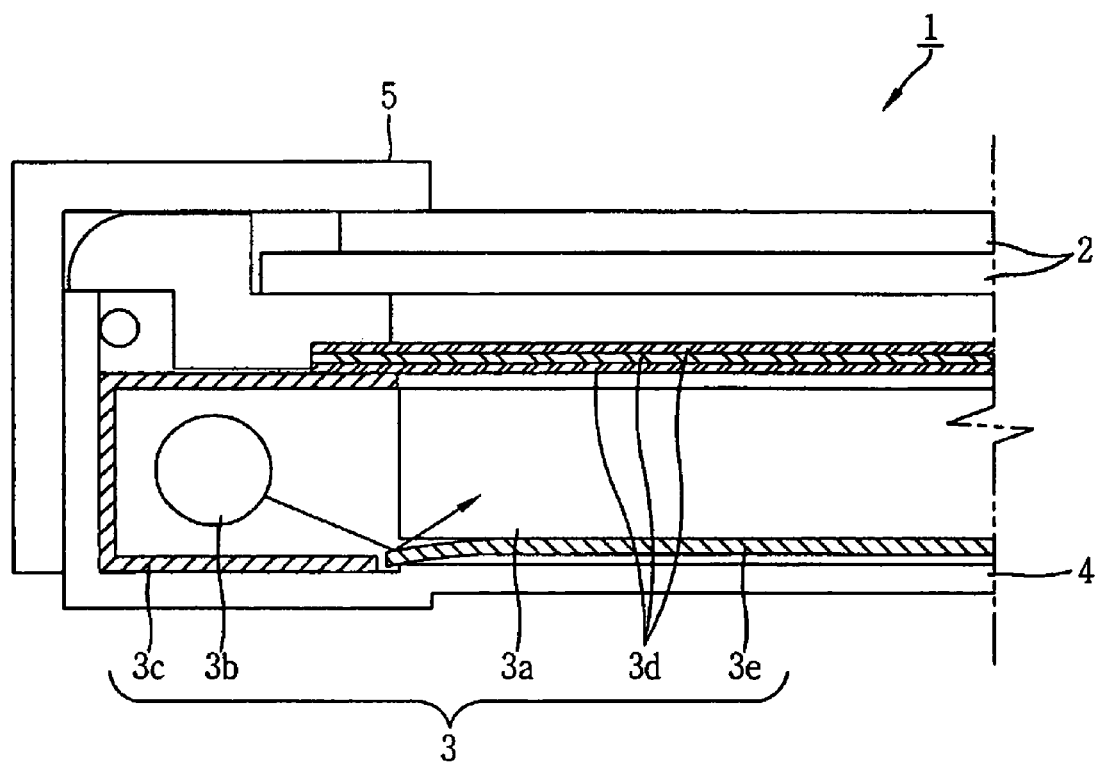
FIG. 1 is a cross-sectional view of a related art liquid crystal display device.
Figure 2:
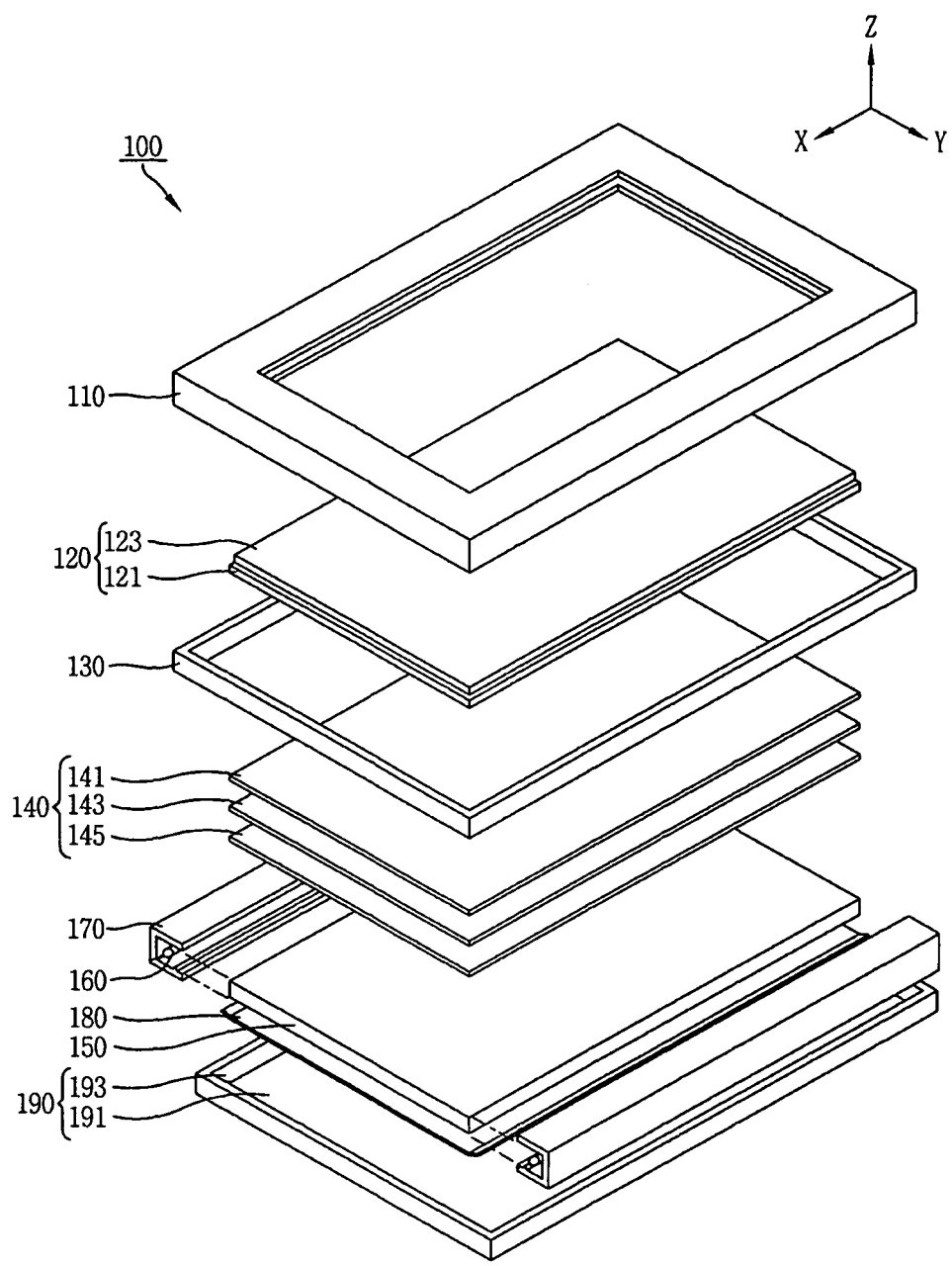
FIG. 2 is an exploded perspective view of a liquid crystal display device according to a first embodiment of the present invention.
Figure 3:
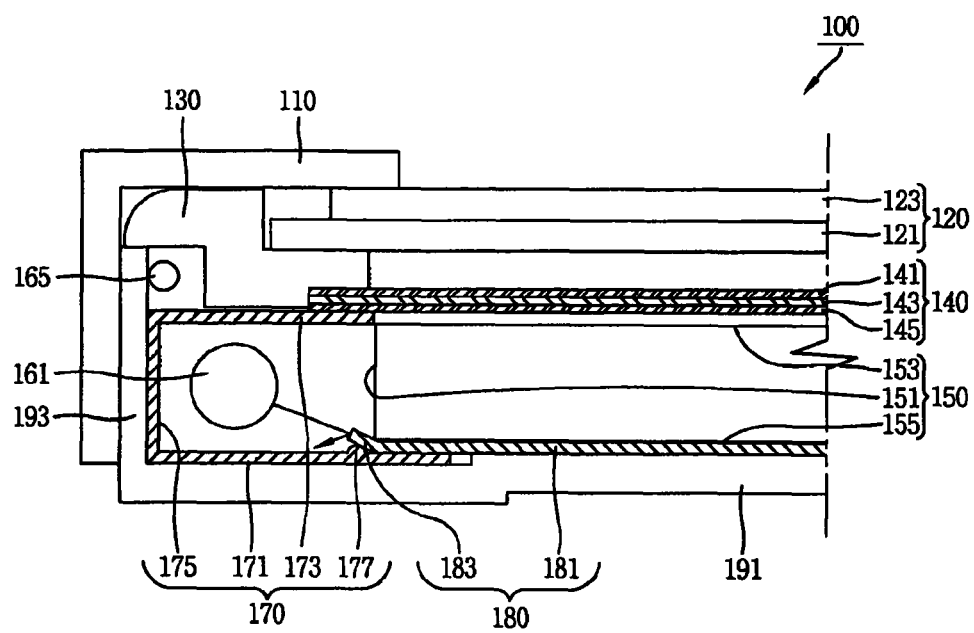
FIG. 3 is a cross-sectional view of the liquid crystal display device according to the first embodiment of the present invention.
Figure 4:
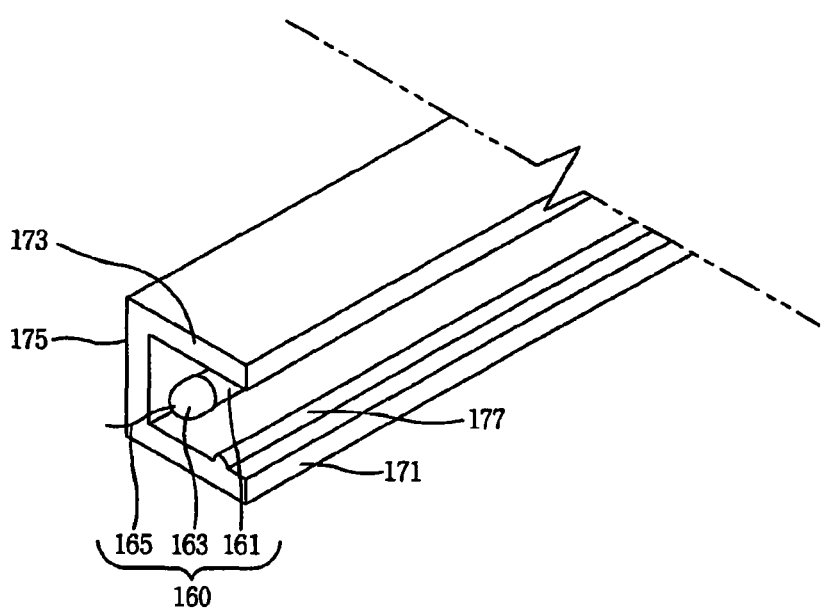
FIG. 4 is a perspective view showing a main part of a lamp housing according to the first embodiment of the present invention.

FIG. 2 is an exploded perspective view of a liquid crystal display device according to a first embodiment of the present invention. FIG. 3 is a cross-sectional view of the liquid crystal display device according to the first embodiment of the present invention, and FIG. 4 is a perspective view showing a main part of a lamp housing according to the present invention.

Referring to FIG. 2, a liquid crystal display device 100 according to a first embodiment of the present invention includes a liquid crystal panel 120 for implementing an image, a driver integrated circuit (not shown) for driving the liquid crystal panel 120, a backlight unit for irradiating light onto a rear surface of the liquid crystal panel 120, a bottom cover 190 for receiving the backlight unit, and a top cover 110 coupled to the bottom cover 190 for covering a front surface of the liquid crystal panel 120.

The top cover 110 is a structure to support front edges of the liquid crystal panel 120. The top cover 110 is provided with a display window to expose an active area (display area) of the liquid crystal panel 120. And, a coupling means, such as a hook (not shown) used for coupling to the bottom cover 190, etc. is provided at a side surface of the top cover 110. The top cover 110 is coupled to the bottom cover 190 to receive the liquid crystal panel 120, the backlight unit, etc. therein.

The liquid crystal panel 120 is configured to have a thin film transistor (TFT) substrate 121, a color filter substrate 123 attached to face the TFT substrate 121, and a liquid crystal (not shown) injected between the TFT substrate 121 and the color filter substrate 123. In addition, the liquid crystal panel 120 is further provided with a polarizer (not shown) respectively attached to a front surface of the color filter substrate 123 and a rear surface of the TFT substrate 121 so as to make light penetrating the liquid crystal panel 120 to be cross-polarized. In the liquid crystal panel 120, liquid crystal cells of a pixel unit are arranged in a matrix shape, and optical transmittance of the liquid crystal cells is adjusted according to picture signal information transferred from a driver integrated circuit (not shown), thus to implement an image.

A plurality of gate lines and a plurality of data lines are formed on the TFT substrate 121 in a matrix shape, and thin film transistors (TFT) are positioned at intersections of the gate lines and the data lines. A signal voltage transferred from the driver integrated circuit (not shown) is applied, through the thin film transistor, between a pixel electrode and a common electrode of the color filter substrate 123, as will be described later. The liquid crystal between the pixel electrode and the common electrode is arrayed according to such signal voltage, thus to set optical transmittance.

The color filter substrate 123 includes a black matrix, a color filter layer of red, green, and blue or of bluish green, fuchsia, and yellow, and the common electrode. The common electrode is formed of a transparent conductive material, such as ITO (Indium Tin Oxide), IZO (Indium Zinc Oxide), or the like. The color filter substrate 123 has a smaller area, compared to the TFT substrate 121.

The driver integrated circuit (not shown) is provided with a terminal so as to be electrically connected, and is mounted on the TFT substrate 121, thereby being connected to each end of the gate lines and data lines of the TFT substrate 121 extending from a display area to a non-display area. Such driver integrated circuit (not shown) is provided using a method, such as a COF (chip on film), TCP (tape carrier package), COG (chip on glass), and the like.

Referring to FIGS. 2 and 3, a mold frame 130 is disposed along the edges of the liquid crystal panel 120 and has a nearly rectangular shape. The mold frame 130 supports the liquid crystal panel 120 so as to be spaced from the backlight unit.

The backlight unit, as shown in FIGS. 2 and 3, includes optical sheets 140 disposed parallel to a rear surface of the liquid crystal panel 120, a light guide plate 150 disposed parallel to a rear surface of the optical sheets 140, a lamp 160 disposed along at least one side surface of the light guide plate 150 so as to irradiate light onto the rear surface of the liquid crystal panel 120 through the optical sheets 140, a lamp housing 170 covering a portion of a circumference of the lamp 160, and a reflecting plate 180 disposed between the lamp 160 and the bottom cover 190 so as to uniformly reflect light irradiated from the lamp 160 to the rear surface of the liquid crystal panel 120.

The optical sheets 140 disposed on a rear surface of the liquid crystal panel 120 include a protection sheet 141, a prism sheet 143, and a diffusion sheet 145. The diffusion sheet 145 is provided with a base plate and a coated layer of a bead-shape formed on the base plate. The diffusion sheet 145 serves to diffuse light from the lamp 160 so as to supply the light to the liquid crystal panel 120. The diffusion sheet 145 may be implemented as 2 or 3 sheets overlap with each other. A prism having a triangular cross-section is formed with a certain pattern on an upper surface of the prism sheet 143. The prism sheet 143 serves to condense light diffused from the diffusion sheet 145 in a vertical direction with respect to a planar surface of the liquid crystal panel 120. In general, 2 prism sheets 143 are used, and a micro-prism formed at each prism sheet 143 has a certain angle. Light having penetrated the prism sheet 143 proceeds almost vertically to provide a uniform luminance distribution. The protection sheet 141 disposed uppermost is configured to protect the prism sheet 141 that is vulnerable to a scratch.

As shown in FIGS. 2 and 3, the light guide plate 150 is disposed on a rear surface of the optical sheets 140. The light guide plate 150 induces light emitted from the lamp 160 to the rear surface of the liquid crystal panel 120. The light guide plate 150 includes an entrance surface 151 for introducing light from the lamp 160, an exit surface 153 extending from the entrance surface 151 to face the optical sheets 140, and a rear surface 155 having a pattern (not shown) so as to proceed light irradiated to the entrance surface 151 from the lamp 160 toward the exit surface 153. The rear surface 155 is disposed to face the bottom cover 190. Accordingly, the light guide plate 150 converts light irradiated onto the entrance surface 151 from the lamp 160 disposed adjacent to the entrance surface 151 into planarized light, and then uniformly irradiates the light onto the liquid crystal panel 120 through the exit surface 153. The light guide plate 150 according to the first embodiment of the present invention is provided with a plate type, in which rear surface 155 and the exit surface 153 are parallel to each other. However, the light guide plate 150 may also use a wedge type, in which the rear surface 155 is inclined and the exit surface 153 is flat.

Referring to FIGS. 2 through 4, the lamp 160 includes a lamp main body 161 for emitting light, a lamp electrode 163 disposed at each end portion of the lamp main body 161, and a lamp wire 165 connected to the both lamp electrodes 163. The lamp 160 is driven by power supplied from an inverter (not shown) through the lamp wire 165. Here, the lamp electrodes 163 and the lamp wire 165 are connected by soldering. And, the lamp 160 is disposed at both side edges of the light guide plate 150 along the entrance surface 151 of the light guide plate 150, as will be described later. A CCFL (Cold Cathode Fluorescent Lamp) is generally used as an optical source for the lamp 160. However, an EEFL (External Electrode Fluorescent Lamp) may also be used since it has a high luminance, low cost, low power consumption and can drive the lamp 160 with one inverter (not shown). Further, an LED (Light Emitting Diode) with excellent luminance and color reproduction characteristics may be used.

The lamp housing 170, referring to FIGS. 3 and 4, covers a portion of the circumference of the lamp 160, and a protrusion portion 177 is disposed on an inner surface of the lamp housing 170 to support the curved portion 183 of the reflecting plate 180. The lamp housing 170 has a cross section of an overall 'C' shape, and serves to receive lamp 160 therein and reflect the light emitted from lamp 160 to the entrance surface 151 of the light guide plate 150. In more detail, the lamp housing 170 according to the present invention includes a first surface 171 and a second surface 173 that are disposed parallel to have the lamp main body 161 therebetween, a third surface 175 for connecting the first and second surfaces 171 and 173, and a protrusion portion 177 protruding from the first surface 171 toward the second surface 173.

The protruding unit 177 is disposed adjacent to the entrance surface 151 of the light guide plate 150, however, is positioned at a location which is not overlapped with the light guide plate 150. This is to minimize interference between the protrusion portion 177 and the light guide plate 150. Further, the protrusion portion 177 according to the present invention supports the curved portion 183 of the reflecting plate 180, and protrudes with a height enough to which the curved portion 183 of the reflecting plate 180 can partially contact the corner of the light guide plate 150. With these configurations, the protrusion portion 177 can support the curved portion 183, and simultaneously, the curved portion 183 can be used to block the spaced area between the light guide plate 150 and the reflecting plate 180, thereby substantially preventing the light from being incident onto the spaced area between the light guide plate 150 and the reflecting plate 180. Accordingly, unwanted light can be prevented from being incident onto the liquid crystal panel 120, thus to minimize the non-uniform luminance and light leakage.

Figure 5:
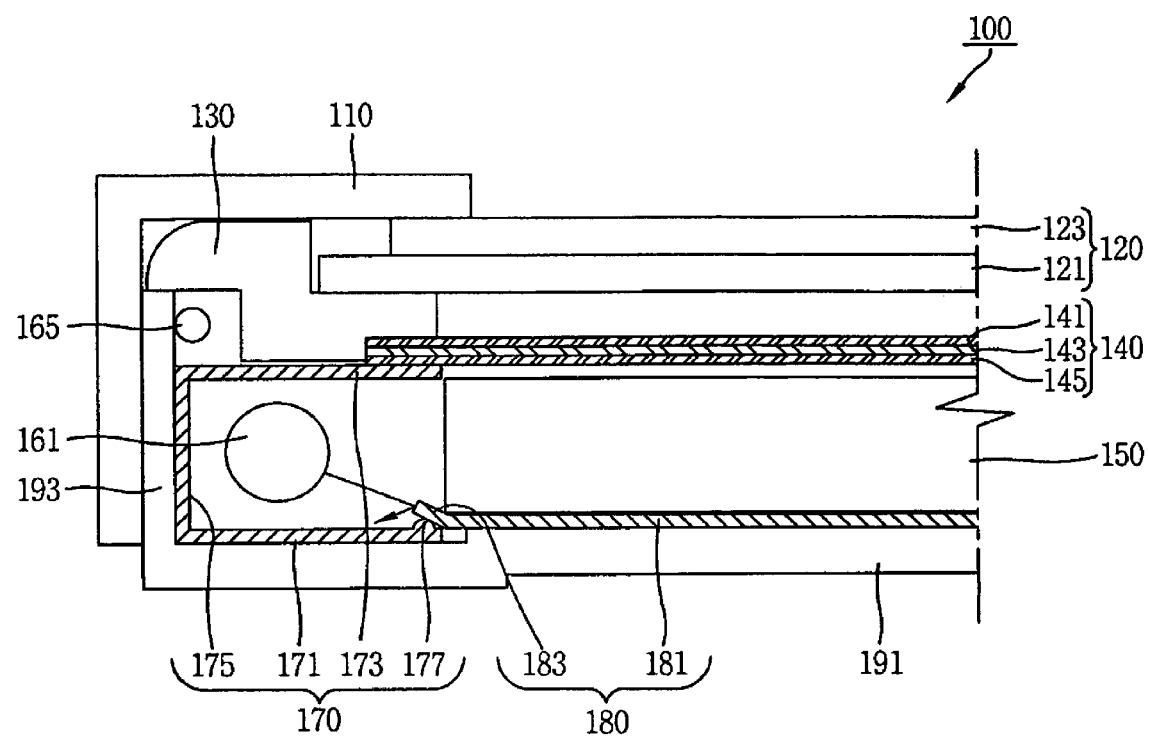
FIG. 5 is a diagram showing a modification of the first embodiment of the present invention.

As shown in FIG. 3, the first surface 171 has a larger area than the second surface 173, and extends such that its end portion can be partially overlapped with the light guide plate 150. Meanwhile, a shape of the lamp housing 170 is not limited to the shape shown in FIG. 3, but may be manufactured as shown in FIG. 5 such that the end portion of the first surface 171 is not overlapped with the light guide plate 150.

The reflecting plate 180 is disposed between the light guide plate 150 and the bottom cover 190 and reflects light from the lamp 160 toward a direction of the liquid crystal panel 120. The reflecting plate 180 according to the present invention is provided with a main body portion 181, and the curved portion 183 curved from the main body portion 181. The curved portion 183 is arranged at an end portion of the reflecting plate 180. More specifically, the curved portion 183 is formed by upwardly curving the end portion of the reflecting plate 180 adjacent to the entrance surface 151 of the light guide plate 150, and partially contacts the corner of the light guide plate 150. The curved portion 183 is extended toward the protrusion portion 177, thereby being supported by the protrusion portion 177. The curved portion 183 contacts the corner of the light guide plate 150, thus to prevent the light emitted from the lamp 160 from being incident onto the area between the light guide plate 150 and the reflecting plate 180. The reflecting plate 180 may be made of PET (polyethylene terephthalate) or PC (Polycarbonate).

The bottom cover 190 is coupled to the upper cover 110 to receive the liquid crystal panel 120 and the backlight unit therein. The bottom cover 190 includes a lower surface portion 191 for mounting the reflecting plate 180 thereon, and a side surface portion 193 upwardly extending from the lower surface portion 191.

Figure 6:
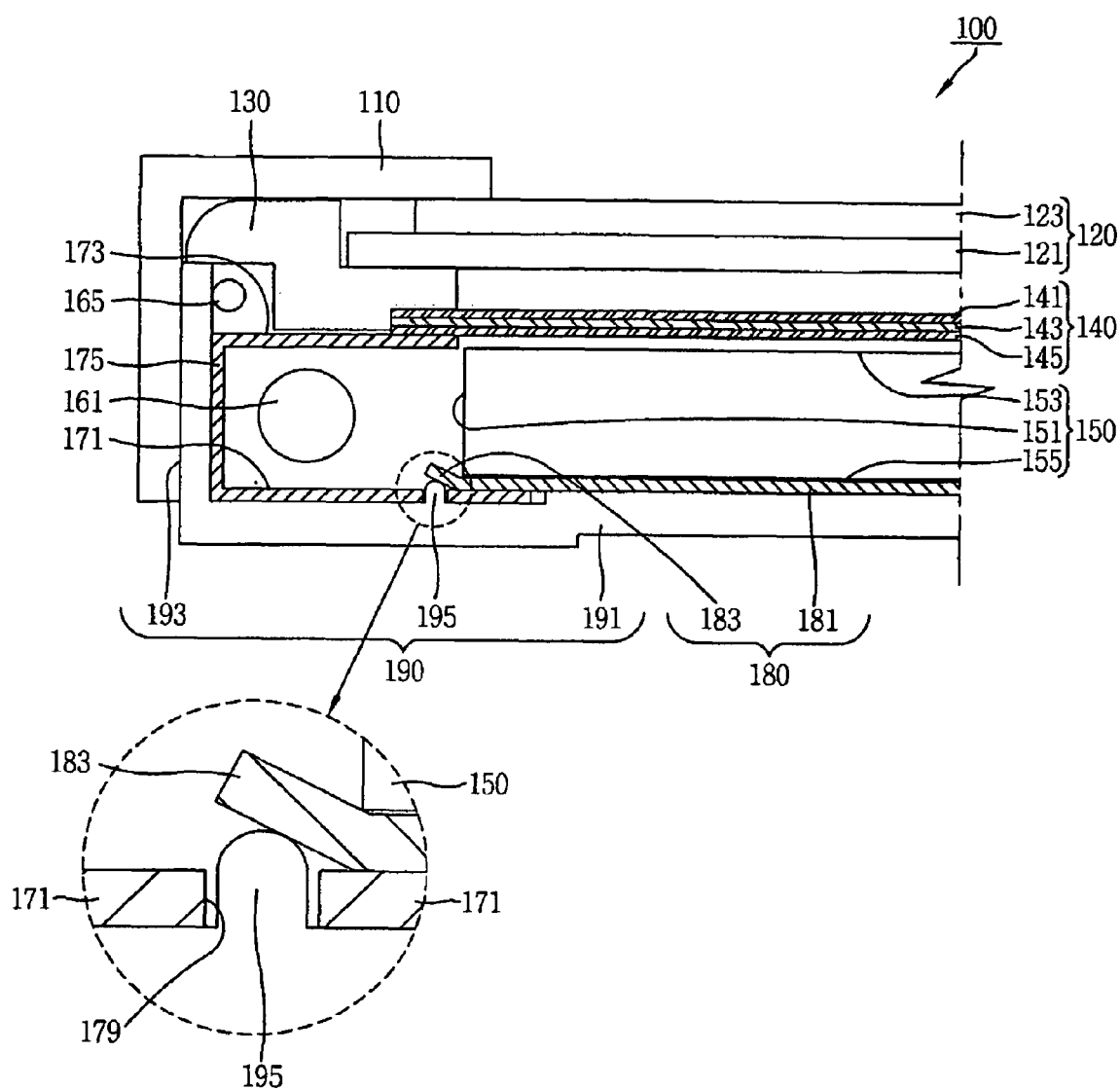
FIG. 6 is a cross-sectional view of the liquid crystal display device according to a second embodiment of the present invention.

Description will now be given in detail of the liquid crystal display device 100 according to a second embodiment of the present invention with reference to FIG. 6. The second embodiment will explain characteristic parts only distinctive from the first embodiment, and a part which explanations therefor are omitted or summarized is considered the same as the first embodiment. Further, for the sake of convenience in explanation, the same reference numerals will be given to those same components.

The liquid crystal display device 100 according to the second embodiment includes a liquid crystal panel 120, a light guide plate 150 disposed in a rear direction of the liquid crystal panel 120, a lamp 160 disposed along an entrance surface 151 of the light guide plate 150, a lamp housing 170 covering a portion of a circumference of the lamp 160, a reflecting plate 180 disposed at a rear surface of the light guide plate 150, and a bottom cover 190 for mounting the reflecting plate 180 thereon.

The bottom cover 190 according to the second embodiment of the present invention is configured to have a lower surface portion 191, and a side surface portion 193 upwardly curved from the lower surface portion 191. The lower surface portion 191 and the side surface portion 193 form a receiving space capable of receiving optical sheets 140, the light guide plate 150, the lamp 160, the lamp housing 170, and the reflecting plate 180 therein. A protrusion portion 195 protruding toward the liquid crystal panel 120 is disposed at the lower surface portion 191 of the bottom cover 190. The protrusion portion 195 according to the second embodiment of the present invention is disposed adjacent to the entrance surface 151 of the light guide plate 150 at a location that is not overlapped with the light guide plate 150.

The lamp housing 170 includes first and second surfaces 171, 173 disposed parallel to each other to have the lamp main body 161 therebetween, a third surface 175 for connecting the first and second surfaces 171 and 173, and an opening 179 for inserting the protrusion portion 195 at a location corresponding to the protrusion portion 195.

Accordingly, the protrusion portion 195 is exposed to the outside by the opening 179, and an end of the exposed protrusion portion 195 is supported by an end portion of the reflecting plate 180. That is, the curved portion 183 of the reflecting plate 180 is supported by the protrusion portion 195, thereby partially contacting the corner of the light guide plate 150. Therefore, light emitted from the lamp 160 cannot be incident onto the area between the light guide plate 150 and the reflecting plate 180. Further, unwanted light can be prevented from being incident onto the liquid crystal panel 120, thus to minimize the non-uniform luminance and light leakage. Also, by coupling the protrusion portion 195 with the opening 179, the lamp housing 170 and the bottom cover 190 can be firmly coupled to each other, thereby being more stable against an external impact.

As so far described, the present invention can provide the liquid crystal display device which can obtain uniform luminance and minimized light leakage.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device, comprising:
    a liquid crystal panel;
    a light guide plate disposed in a rear direction of the liquid crystal panel;
    a lamp disposed along at least one side edge of the light guide plate;
    a lamp housing covering a portion of a circumference of the lamp;
    a bottom cover; and
    a reflecting plate disposed at a rear surface of the light guide plate, between the rear surface of the light guide plate and the bottom cover,
    wherein a protrusion portion is formed on an inner surface of the lamp housing adjacent to a light input surface of the light guide plate, such that the protrusion is disposed between the lamp housing and the reflecting plate,
    wherein an outermost portion of the reflecting plate, which is extended from the light guide plate, is curved to the light input surface of the light guide plate a predetermined angle by the protrusion portion, such that the light to the region between the light guide plate and the reflecting plate is blocked by the curved portion of the reflecting plate,
    wherein the surface of the lamp housing is contacted with a part of the upper surface of the bottom cover,
    wherein a side of the protrusion portion is configured to receive light directly from the lamp through air, and
    wherein a portion of the surface of the lamp housing is configured to receive light directly from the lamp through the air.

2. The liquid crystal display device of claim 1, wherein the lamp housing is provided with first and second surfaces disposed parallel to each other having the lamp therebetween and a third surface for connecting the first and second surfaces, and the protrusion portion protrudes toward the second surface from the first surface adjacent to the reflecting plate.

3. The liquid crystal display device of claim 2, wherein the light guide plate has an entrance surface onto which light from the lamp is incident, and the protrusion portion is disposed adjacent to the entrance surface.

4. The liquid crystal display device of claim 2, wherein the protrusion portion is not overlapped with the light guide plate.

5. The liquid crystal display device of claim 2, wherein the first surface extends to be partially overlapped with the light guide plate.

6. The liquid crystal display device of claim 2, wherein the first surface is not overlapped with the light guide plate.

7. The liquid crystal display device of claim 1, wherein the reflecting plate includes a main body portion and a curved portion being curved from the main body portion, and the curved portion extends toward the protrusion portion so as to be supported thereat.

8. The liquid crystal display device of claim 7, wherein the curved portion serves to prevent light emitted from the lamp from being incident onto an area between the light guiding plate and the reflecting plate.

9. The liquid crystal display device of claim 7, wherein a portion of the curved portion contacts a corner of the light guiding plate.

10. The liquid crystal display device of claim 1, wherein the protrusion is formed with a predetermined height without overlapping with the lamp either horizontally or vertically.

* * * * *